United States Patent [19]

Chang et al.

[11] Patent Number: 5,469,479
[45] Date of Patent: Nov. 21, 1995

[54] DIGITAL CHIRP SYNTHESIZER

[75] Inventors: Christopher T.-M. Chang, Dallas; William A. White, Garland, both of Tex.

[73] Assignee: Texas Instruments Incorporated, Dallas, Tex.

[21] Appl. No.: 842,698

[22] Filed: Feb. 27, 1992

[51] Int. Cl.[6] ........................................... G01S 7/282
[52] U.S. Cl. .................. 375/377; 375/309; 364/721; 342/201; 342/202; 342/204
[58] Field of Search ........................... 364/718, 721, 364/729; 455/260, 76, 183.1; 331/1 R, 10, 12, 1 A; 375/269, 272, 279, 303, 308, 329, 334; 342/200–204

[56] References Cited

U.S. PATENT DOCUMENTS

| | | | |
|---|---|---|---|
| 4,024,385 | 5/1977 | Richards | 364/721 |
| 4,652,832 | 3/1987 | Jasper | 364/721 |
| 4,816,774 | 3/1989 | Martin | 455/260 |
| 4,958,310 | 9/1990 | Goldberg | 364/718 |
| 4,962,510 | 10/1990 | McDavid et al. | 375/67 |
| 5,146,473 | 9/1992 | Critchlow et al. | 375/8 |
| 5,311,193 | 5/1994 | Parkes | 342/201 |

FOREIGN PATENT DOCUMENTS 2239748  7/1991  United Kingdom .................. 364/721

*Primary Examiner*—Young Tse
*Attorney, Agent, or Firm*—René E. Grossman; Richard L. Donaldson

[57] ABSTRACT

A monolithic digital chirp synthesizer (DCS) chip using GaAs/AlGaAs HI$^2$L technology. The 6500 HBT gate DCS chip is capable of producing linear frequency modulated (chirp) waveforms or single frequency waveforms. The major components of the DCS are two pipelined accumulators, a sine ROM, a cosine ROM and two digital to analog converters.

26 Claims, 4 Drawing Sheets

DIGITAL CHIRP SYNTHESIZER

BACKGROUND OF THE INVENTION

1. Field of the Invention

This invention relates to a chirp synthesizer and, more specifically, to a high speed digital integrated circuit (IC) which generates the inputs required by a digital to analog (D/A) converter to synthesize a given single frequency waveform or a sweeping frequency or "chirp" signal.

2. Brief Description of the Prior Art

Direct digital synthesis (DDS) of sinusoidal waves is well known and has been successfully demonstrated in the prior art. Such synthesizers offer wide bandwidth, fine frequency resolution, low phase noise and exceptionally fast frequency switching capability and find use in communication and electronic warfare (EW) systems. Linear F.M. (chirp) waveform generators are frequently used in military systems, such as compressive receivers in radar and EW systems. The swept oscillator function is typically performed with a surface acoustic wave (SAW) expander or with discrete digital ECL or GaAs components.

Digital generation of chirp waveforms is based upon the architecture of direct digital synthesizers. In the prior art, such synthesizers have been confined to the generation of low frequency sinusoidal signals in small increments in VHF and UHF systems due to limitations imposed by the speed of the digital circuits available and the inability to integrate the complex functions on a small number of chips. Examples of such prior art are set forth in articles of Michael P. LaMacchia et al., "Flight GaAs Numerically Controlled Oscillator", *Technical Digest,* 1989 GaAs Symposium, pp 49–51 and J. Browne, "All GaAs Lineup Fuels High-Speed Digital Synthesizer" *Microwave & RF,* July 1988, pp 129–131. Such chips contained one accumulator and/or one ROM interfacing to a digital to analog converter chip. Recent advances in GaAs IC technology have improved the chip speed and integration potential. However, due to the relative complexity of the frequency synthesizing function and waveforms desired, such complex waveforms have not been directly synthesized.

Digital synthesis of chirp waveforms has been discussed in the prior art in articles by Richard Appis et al., "A Digital Linear FM Generator for Multi-Mode RADAR" *Proceeding of the Tri-Services RADAR Symposium,* 1988 and Eric Munro et al., "Vector Arbitrary Waveform Synthesis Simplifies Chirp Radar Test", *Microwave Systems News, March* 1981, pp. 22–25. These articles relate to large systems constructed with existing components.

The art has been unable, to date, to provide a chirp synthesizer in a monolithic circuit which also provides the required specifications available in the prior art.

SUMMARY OF THE INVENTION

In accordance with the present invention, there is provided a digital chirp synthesizer which provides the desired properties and which can be fabricated on a single semiconductor chip.

Briefly, in accordance with the present invention, there is provided a direct digital synthesizer having a first register for receiving an input signal, a first accumulator for adding the input signal to the prior sum signal stored in the first accumulator to provide and store a first new sum signal, a second accumulator for adding the new sum signal to the prior sum signal stored in the second accumulator to provide and store a second new sum signal in the second accumulator and a function generator responsive to the second new sum signal to generate a function signal corresponding to the second new sum signal. The function generator is at least one of a sine wave ROM or a cosine wave ROM for generating a signal representing a sine wave having a frequency related to the second new sum signal and the first and second accumulators each comprise a pipeline adder coupled to a delta phase register, the output of the phase increment register being coupled to the input of the associated pipeline adder. All of the circuitry of the direct digital synthesizer is contained on a single semiconductor chip.

DESCRIPTION OF THE PREFERRED EMBODIMENT

Figures 1, 2:
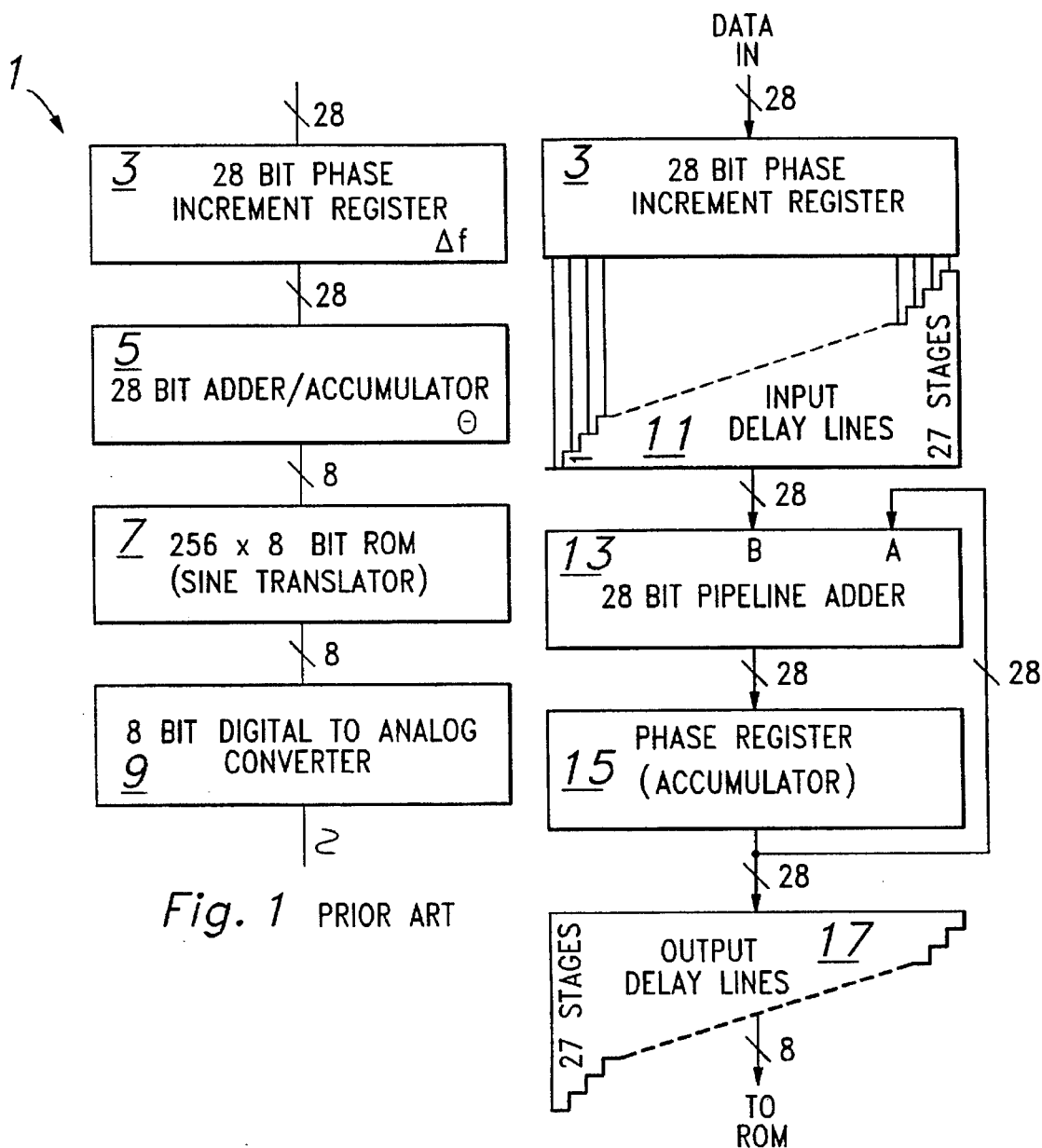
FIG. 1 is a block diagram of a typical prior art direct digital synthesizer.
FIG. 2 is a block diagram of a prior art pipeline adder/accumulator.

Referring first to FIG. 1, there is shown a block diagram of a typical prior art direct digital synthesizer 1. The synthesizer includes a 28 bit phase increment register 3 which receives an input along 28 input lines and provides an output along 28 output lines therefrom to 28 inputs of a 28 bit pipelined adder/accumulator 5. This output to the adder/accumulator 5 is added to the contents of the adder/accumulator at that time, the adder/accumulator providing an 8 bit output to a 256×8 bit ROM or sine translator 7. The ROM 7 stores the sine coefficients for the numerical generation of the sine wave having a phase angle corresponding to the inputs from the adder/accumulator and provides an 8 bit output to an 8 bit digital to analog converter 9. The digital to analog converter 9 converts the digital numbers generated by the ROM into analog voltages to provide the sine waveform, as indicated by the sine wave at its output, with frequency corresponding to the input data fed to the register 3. All of the circuits shown in the boxes of FIG. 1 are known in the prior art.

The key to implementation of a DDS is the design of the adder/accumulator 5 which provides a sum every clock cycle to form the instantaneous phase $\phi=wt$. Since the sum in the adder portion of the adder/accumulator is the prior sum therein plus the phase increment received from the register 3, and since one can be certain of having the value of the more significant bit only after the arrival of the carry from the next less significant bit, some forms of pipeline are required.

FIG. 2 shows a prior art pipeline arrangement which satisfies the above noted requirement. In this arrangement, the 28 bit input is applied to the phase increment register 3 as in FIG. 1. However, the 28 outputs of the phase increment register 3 are delayed in a delay circuit 11 prior to entry into the 28 bit pipeline adder 13 whereby the summing of the high order (i.e. more significant) bits are properly delayed until the arrival of the corresponding carry bit from the addition at the next less significant bit level. The delays are achieved with serial shift registers with different lengths (i.e. zero delay for the 28th or least significant bit, 1 bit delay for the 27th bit, 2 bit delay for the 26th bit, . . . , 27 bit delay for the first or most significant bit). The output of the adder 13 is fed to a phase register/accumulator 15 from which is provided a 28 bit output which is fed back to the adder 13 and summed in the next step in the adder with the next input thereto from the register 3 and delay lines 11. To preserve the sums for the lower order bits, another set of serial registers 17 is installed at the output of the accumulator 15. These serial registers have 1 bit delay for the 27th bit and increase to a 27 bit delay for the first or least significant bit to offset the delay from the input delay line 11. The eight most significant bits from the delay line 17 are then sent to the ROM 7 as in FIG. 1 to select the proper sine coefficients. The boxes shown in FIG. 2 all represent well known circuits.

To synthesize a sinusoidal waveform (i.e., sin wt) in minimum time, with reference to FIG. 2, a 28 bit phase increment signal w is placed at the input of the register 3. The accumulator register is loaded with some initial value which can include zero. At the first clock cycle, the least significant bit is applied to the adder 13 from register 3. A sum and a carry for this bit is generated in the adder 13 and the carry is added to the next less significant bit which arrives after additional delay and so forth for all of the digits. The sum at each bit level is fed to the phase register or accumulator 15. These signals stored in the accumulator 15 are then fed back at the bit level to the bit with the same significance in adder 13 for addition with the next signal from the phase increment register 3 of the same significance and are also sent to the delay line 17. After being delayed in delay line 17 in the reverse delay order as in delay line 11 to offset the delay provided by delay line 11, the eight most significant bits output from the delay line 17 are fed to the ROM 7 (FIG. 1) where a pre-stored number or coefficients proportional to the sine of the angle selected which corresponds to the eight bit signal applied thereto is stored, there being a different pre-stored number of coefficients for the sine of all angles therein corresponding to each possible eight bit input thereto. The value of the eight bit signal determines the frequency of the sine wave selected. The ROM 7 also utilizes the value of the selected sine of the angle to generate a digital representation of the selected sine coefficients, this digital signal being transferred from the ROM 7 to the digital to analog converter 9 to provide the selected analog sine wave output. A chirp signal is obtained by sweeping the input to the register 3 to provide a linearly-modulated frequency for the sine wave output from the converter 9 as opposed to a constant frequency output which can also be obtained in obvious manner.

Figure 3:
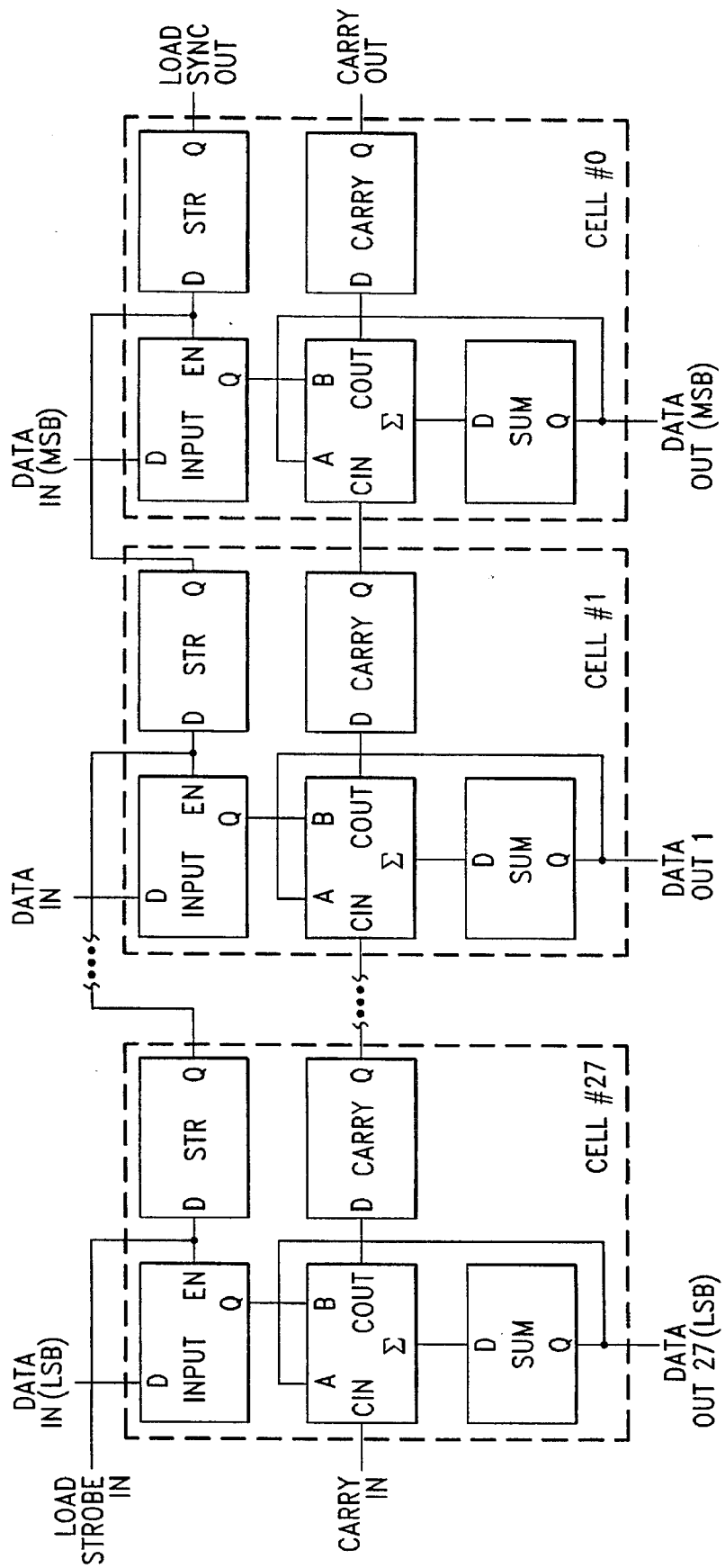
FIG. 3 is a circuit diagram of a prior art implementation of the circuit of FIG. 2.

Referring now to FIG. 3, there is shown a simpler prior art implementation of the circuit of FIG. 2. In this embodiment, each stage (Cell #0 . . . Cell #27) has an input-register, a full adder (Σ) and three edge-triggered flip-flops to store the sum, carry and strobe pulse (STR). Note that the output of the sum flip-flop (i.e., Q terminal) is connected to the A input of the full-adder to achieve the accumulator function. The STR flip-flops from different stages or cells are connected as a serial shift-register to provide the enable signals for the input registers so that the input of a given stage is loaded into the input register at the same time as the carry input for that stage is generated. In this way, the bits are properly aligned and synchronized without the use of the input delay lines shown in FIG. 2.

Figure 4:
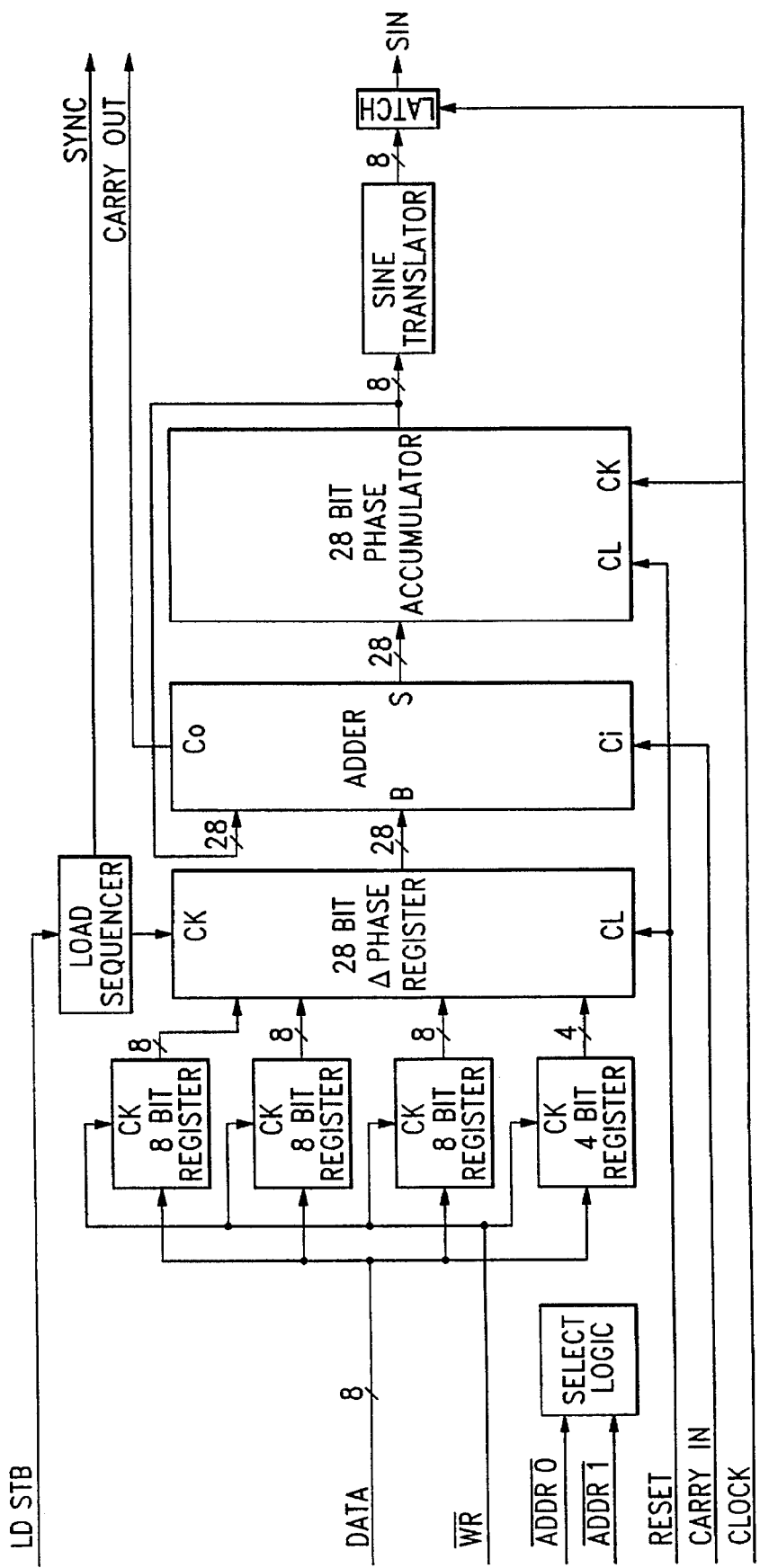
FIG. 4 is a block diagram of a prior art numerical controlled oscillator.

Referring now to FIG. 4, there is shown a further prior art system wherein the pin requirement at the input of the system is decreased from multiplexing. The data enters in 8 bit parallel groups and then a four bit group, the groups being stored successively in the three 8 bit registers and then in the 4 bit register. The outputs from the 8 bit registers and 4 bit register are stored in the 28 bit phase shift register with operation thereafter continuing in the manner discussed above with reference to FIG. 1.

Figure 5:
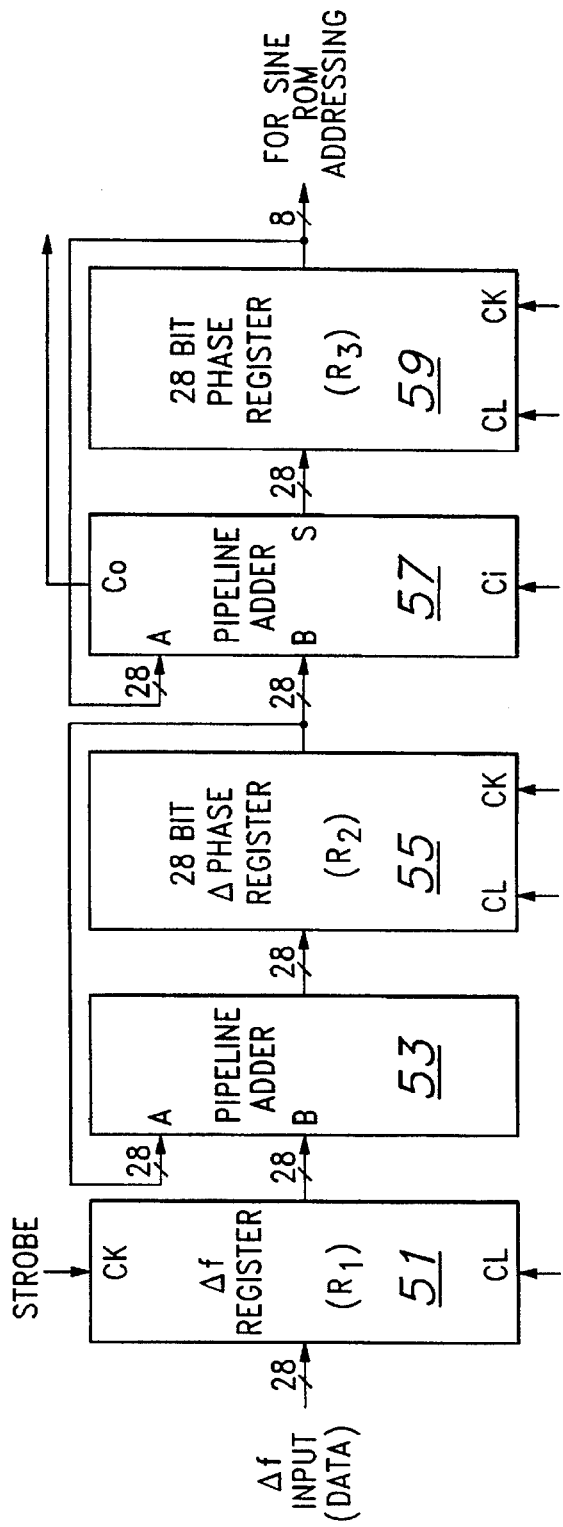
FIG. 5 is a block diagram of a portion of a digital chirp synthesizer in accordance with the present invention.

Referring now to FIG. 5, there is shown a circuit for generating a chirp signal in accordance with the present invention wherein the contents of all of the blocks are standard and well known circuits. In the case of the circuit of FIG. 5, the frequency of the output sine wave signal changes in a manner known as linear frequency modulation. Before the beginning of a chirp cycle, all three phase registers, 51, 55 and 59 are cleared by a clear signal (CL) and initialized. The initialization of registers 55 and 59 is accomplished through direct loading at the registers, if such a provision is included in the circuitry, or by serial loading through the two pipeline adders 53, 57 by addition. With a circuit configuration as shown in FIG. 5, a linearly modulated frequency is generated at the output of register 59. This can be seen from Table 1 where the registers 51, 55 and 59 are initialized to (i.e., store) 2C, C+B and A respectively in two's complement binary form as shown in the Table hereinafter. After the first clock cycle, registers 55 and 59 have 3C+B and C+B+A respectively with the output of the register 55 being fed back to pipeline adder 53 for addition to the next signal from register 51 and the output of register 59 being fed back to pipeline adder 57 for addition to the next signal from register 55. The results of these registers after successive clock cycles are also tabulated in the Table. In general, the results for registers 55 and 59 after n cycles are C (2n+1)+B and $Cn^2+Bn+A$, respectively. Since the time interval for n cycles, t, is $n\Delta t$, where $\Delta t$ is the clock cycle, the output of register 59 is:

$$\begin{aligned} \text{phase} &= C(n^2\Delta t^2) + Bn\Delta t + A \\ &= [C(n\Delta t) + B](n\Delta t) + A \\ &= [Ct + B] + A \end{aligned}$$

where the frequency, Ct+B, is increased linearly with time, i.e., linearly modulated.

The most significant 8 bits out of register 59 are sent to the ROM 7 as in FIG. 1 for processing to provide the required sine wave output with continually varying frequency. This permits generation of a sine wave with an ever increasing or ever decreasing frequency which is a chirp signal. It can be seen that a constant sine wave of any frequency can also be provided if there is no further input to the register 51.

More specifically, the digital synthesis of the chirp waveform is based upon the realization that the quadratic time base $$\phi(t)=Ct^2+Bt+A$$

can be generated numerically at high speed using addition only. Again, with reference to FIG. 6, wherein all blocks are standard and well known circuits and which is a block diagram of a digital chirp synthesizer with two accumulators, the two accumulators being depicted by the two sets of a pipeline adder and a phase increment register in FIG. 5, the outputs of the accumulators are stored in the registers. The Table hereinbelow presents the contents of the rate register 61, and the two accumulator registers 63 and 65 (as well as for registers 51, 55 and 59) for the first few and nth clock cycles in a chirp generation sequence. This illustrates the process of the quadratic time base generation. After register initialization, the results of register 63 (or register 65) at each clock cycle are obtained from the sum of data stored in itself and register 61 (or register 63) in the previous clock cycle. The phases generated in the Table are identical to those of the above equation when "t" is replaced by $n\Delta t$, where $\Delta t$ is the clock period.

TABLE

| CLOCK CYCLE | 51, 61 (Rate) | 55, 63 (Frequency) | 59, 65 (Phase) |
|---|---|---|---|
| Initial values | 2C | C + B | A |
| 1 | 2C | 3C + B | $C1^2 + 1B + A$ |
| 2 | 2C | 5C + B | $C2^2 + 2B + A$ |
| 3 | 2C | 7C + B | $C3^2 + 3B + A$ |
| . | . | . | . |
| . | . | . | . |
| . | . | . | . |
| n | 2C | C(2n + 1) + B | $Cn^2 + Bn + A$ |

The 28 bit initial frequency, B, and the 20 bit sweep rate, C, are loaded through an 8 bit data bus into the registers asynchronously and held there until a chirp trigger signal is received.

Conventional sine and cosine ROM tables 67 and 69 are used to convert the phase generated by the double accumulator into the trigonometric functions. The predetermined number of most significant bits of the second accumulator (10 in the case of FIG. 6) are used to address a sine ROM 67 and the cosine ROM 69, the ROMs being shifted by 90 degrees to select a digital representation of the desired sine wave as discussed above. This digital output is converted to an analog function by the digital to analog converters 71 and 73 at the outputs of the sine and cosine ROMs 67 and 69 respectively to provide the desired analog output signals for both sine and cosine. By altering the initial delta f input as a function of time (df/dt), the chirp output is obtained.

In operation, a start frequency (f) and a sweep rate df/dt are fed to the register, the sweep rate signal being fed at each clock signal to the register 63 and added therein to the output of the first accumulator (not shown) which is a part of the register 63. This first accumulator is then cleared and the sum is then stored in the first accumulator. Also, during the same clock period, the sum previously stored in the first accumulator is fed to the register 65 and added therein to the output of the second accumulator (not shown) which is a part of the register 65. The second accumulator is then cleared and the sum is stored in the second accumulator. The output of the second accumulator is fed to a sine ROM 67 and/or a cosine ROM 69 as discussed above with reference to the sine ROM in FIG. 1, the digital output of the ROM being converted to the desired analog signal by the associated digital to analog converter (DAC) 71 and/or 73.

Figure 6:
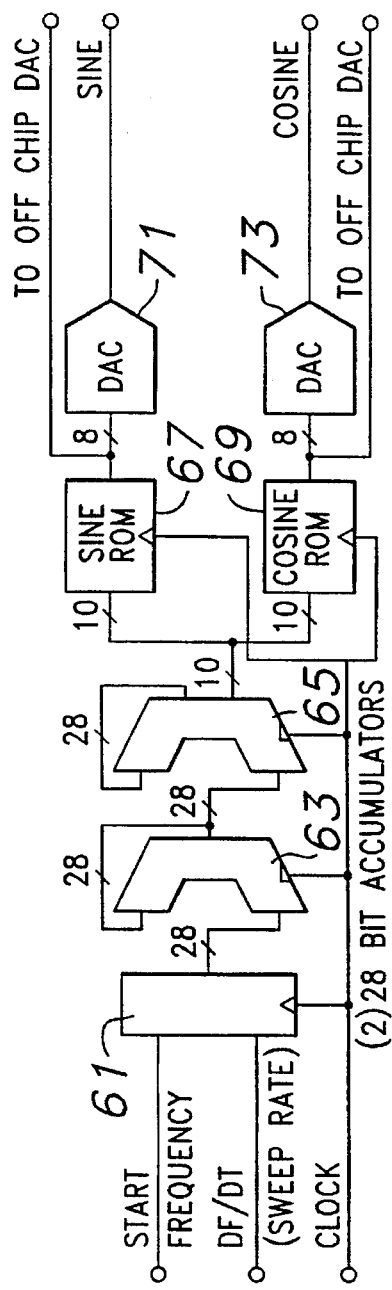
FIG. 6 is another embodiment of a digital chirp synthesizer in accordance with the present invention.

As stated above, the above described embodiments of FIGS. 5 and 6 are implemented in a single semiconductor chip with digital, analog and memory circuitry all on the same chip. The chip is preferably fabricated using GaAs/AlGaAs HI²L technology.

An article entitled "Monolithic GaAs Dual-Channel Digital Chirp Synthesiser Chip" by G. Van Andrews et al., *Electronics Letters*, Vol 27, No. 11, 23rd May, 1991, pp 905–6, postdates the date of the invention herein and is incorporated herein by reference. Also similarly incorporated herein by reference is an article entitled "A Monolithic Digital Chirp Synthesizer Chip With I and Q Channels" by G. Van Andrews et al., Technical Digest, 1991, IEEE GaAs Ic Symposium, pp 19–21.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

We claim:

1. A direct digital chirp synthesizer for synthesizing a carrier frequency which is increased linearly for the duration of a pulse code, which comprises:

(a) a rate register for receiving and storing an input signal;

(b) a first digital accumulator for first adding said input signal stored in said rate register to a signal then stored in said first accumulator to provide and store a first new sum signal in said first accumulator in response to said first adding;

(c) a second digital accumulator for second adding said first new sum signal to a signal then stored in said second accumulator to provide and store a second new sum signal in said second accumulator in response to said second adding; and (d) a function generator responsive to said second new sum signal to generate an analog function signal corresponding to said second new sum signal.

2. The synthesizer as set forth in claim 1 wherein said function generator is at least one of a sine wave ROM and a cosine wave ROM for generating a signal representing a sine wave and a cosine wave having a frequency related to said second new sum signal.

3. The synthesizer as set forth in claim 2 wherein said first accumulator comprises a first adder having a first input, a second input and a first output, said first output coupled to a first register, the output of said first register being coupled to said first input of said first adder and said rate register being coupled to said second input of said first adder.

4. The synthesizer as set forth in claim 3 wherein said second accumulator comprises a second adder having a third input, a fourth input and a second output, said second output coupled to a second register, the output of said second register being coupled to said third input of said second adder and said first output being coupled to said fourth input of said second adder.

5. The synthesizer as set forth in claim 4 wherein said rate register, said first and second accumulators and said function generator are all disposed on a single semiconductor chip.

6. The synthesizer as set forth in claim 3 wherein said rate register, said first and second accumulators and said function generator are all disposed on a single semiconductor chip.

7. The synthesizer as set forth in claim 2 wherein said second accumulator comprises a second adder having a third input, a fourth input and a second output, said second output coupled to a second register, the output of said second register being coupled to said third input of said second adder and said first output being coupled to said fourth input of said second adder.

8. The synthesizer as set forth in claim 7 wherein said rate register, said first and second accumulators and said function generator are all disposed on a single semiconductor chip.

9. The synthesizer as set forth in claim 2 wherein said rate register, said first and second accumulators and said function generator are all disposed on a single semiconductor chip.

10. The synthesizer as set forth in claim 1 wherein said first accumulator comprises a first adder having a first input, a second input and a first output, said first output coupled to a first register, the output of said first register being coupled to said first input of said first adder and said rate register being coupled to said second input of said first adder.

11. The synthesizer as set forth in claim 10 wherein said second accumulator comprises a second adder having a third input, a fourth input and a second output, said second output coupled to a second register, the output of said second register being coupled to said third input of said second adder and said first output being coupled to said fourth input of said second adder.

12. The synthesizer as set forth in claim 11 wherein said rate register, said first and second accumulators and said function generator are all disposed on a single semiconductor chip.

13. The synthesizer as set forth in claim 10 wherein said rate register, said first and second accumulators and said function generator are all disposed on a single semiconductor chip.

14. The synthesizer as set forth in claim 1 wherein said second accumulator comprises a second adder having a third input, a fourth input and a second output, said second output coupled to a second register, the output of said second register being coupled to said third input of said second adder and said first output being coupled to said fourth input of said second adder.

15. The synthesizer as set forth in claim 14 wherein said rate register, said first and second accumulators and said function generator are all disposed on a single semiconductor chip.

16. The synthesizer as set forth in claim 1 wherein said rate register, said first and second accumulators and said function generator are all disposed on a single semiconductor chip.

17. The synthesizer of claim 1 wherein said function generator comprises means responsive to said second new sum signal to provide a representation of a trigonometric function corresponding to said second new sum signal.

18. The synthesizer of claim 17 wherein said representation of said trigonometric function is a digital representation thereof, further including a digital to analog converter for converting said digital representation to an analog representation.

19. The synthesizer as set forth in claim 18 wherein said rate register, said first and second accumulators and said means responsive to said second new sum signal are all disposed on a single semiconductor chip.

20. The synthesizer as set forth in claim 17 wherein said rate register, said first and second accumulators and said means responsive to said second new sum signal are all disposed on a single semiconductor chip.

21. A direct digital chirp synthesizer for synthesizing a carrier frequency which is increased linearly for the duration of a pulse code, which comprises:
  (a) a single semiconductor chip including thereon:
    (i) a rate register for receiving a digital input signal;
    (ii) accumulator means for adding the received digital input signal to a previously stored digital sum signal then stored in said accumulator means to provide and store in said accumulator means a later digital sum signal responsive to said adding; and
    (iii) a function generator responsive to said later digital sum signal to generate an analog function signal corresponding to said later digital sum signal.

22. The synthesizer of claim 21 wherein said accumulator means comprises a first accumulator element storing a prior first digital sum signal and adding said received digital input signal to said prior first digital sum signal to provide a later first digital sum signal and a second accumulator element for adding said later first digital sum signal to a prior second digital sum signal to provide a later second digital sum signal and storing said later second digital sum signal in said second accumulator element, said function generator being responsive to said later second later digital sum signal.

23. The synthesizer of claim 22 wherein said function generator comprises at least one of a sine ROM or a cosine ROM for generating a digital signal of at least one of sine coefficients or cosine coefficients corresponding to said later second digital sum signal stored in said second accumulator element.

24. The synthesizer of claim 23 wherein said function generator further includes a digital to analog converter to convert said digital signal corresponding to said later second digital sum signal to a corresponding analog signal.

25. The synthesizer of claim 21 wherein said function generator comprises at least one of a sine ROM or a cosine ROM for generating a digital signal of at least one of sine coefficients or cosine coefficients corresponding to said later digital sum signal.

26. The synthesizer of claim 25 wherein said function generator further includes a digital to analog converter to convert said digital signal corresponding to said later digital sum signal to a corresponding analog signal.

\* \* \* \* \*